(12) United States Patent
Eder (10) Patent No.: US 10,774,969 B2
(45) Date of Patent: Sep. 15, 2020

(54) DEVICE AND METHOD FOR HEATING A FLUID IN A PIPELINE USING THREE-PHASE CURRENT

(71) Applicant: LINDE AKTIENGESELLSCHAFT, Munich (DE)

(72) Inventor: Kurt Eder, München (DE)

(73) Assignee: Linde Aktiengesellschaft, Munich (DE)

( * ) Notice: Subject to any disclaimer, the term of this patent is extended or adjusted under 35 U.S.C. 154(b) by 493 days.

(21) Appl. No.: 15/318,680

(22) PCT Filed: Jun. 18, 2015

(86) PCT No.: PCT/EP2015/001237
§ 371 (c)(1),
(2) Date: Dec. 14, 2016

(87) PCT Pub. No.: WO2015/197181
PCT Pub. Date: Dec. 30, 2015

(65) Prior Publication Data
US 2017/0130887 A1    May 11, 2017

(30) Foreign Application Priority Data
Jun. 26, 2014  (EP) .................................. 14002193

(51) Int. Cl.
*H05B 3/00* (2006.01)
*F16L 53/37* (2018.01)
(Continued)

(52) U.S. Cl.
CPC ................ *F16L 53/37* (2018.01); *C10G 9/24* (2013.01); *F24H 1/105* (2013.01); *H05B 3/0004* (2013.01);
(Continued)

(58) Field of Classification Search
CPC ........... C10G 9/00; C10G 9/24; F16L 53/374; H05B 3/0028; H05B 3/0004; H05B 2203/021; H05B 2203/022
(Continued)

(56) References Cited

U.S. PATENT DOCUMENTS 3,293,407 A * 12/1966 Ando .................... F24H 1/101
138/33
7,932,480 B2 * 4/2011 Gu ........................ H05B 1/0244
219/482

(Continued)

FOREIGN PATENT DOCUMENTS

DE     710187 C1    9/1941
DE     1234882 B    2/1967
(Continued)

OTHER PUBLICATIONS

Search report in corresponding EP application 19020715 dated Apr. 8, 2020 (1 Page).

*Primary Examiner* — Brian W Jennison
(74) *Attorney, Agent, or Firm* — Millen, White, Zelano & Branigan, P.C.; William Nixon (57) ABSTRACT

A device for heating a fluid, including at least one electrically conductive pipeline for accommodating the fluid, and at least one voltage source connected to a respective pipeline. The voltage source is designed to generate an electric current in the connected pipeline which heats the pipeline in order to heat the fluid. Each voltage source has M outer conductors, where M is a natural number greater than or equal to two. Each voltage source is designed to provide an AC voltage at the outer conductors, wherein those AC voltages are phase-shifted through $2\pi/M$ with respect to one another, and wherein the outer conductors are electrically conductively connected to the pipeline such that a star circuit is formed.

22 Claims, 4 Drawing Sheets

(51) Int. Cl.
*F24H 1/10* (2006.01)
*C10G 9/24* (2006.01)

(52) U.S. Cl.
CPC .. *H05B 2203/021* (2013.01); *H05B 2203/022* (2013.01)

(58) Field of Classification Search
USPC .......................................................... 219/201
See application file for complete search history.

(56) References Cited

U.S. PATENT DOCUMENTS

| | | | |
|---|---|---|---|
| 8,811,806 B2* | 8/2014 | Radan | H02M 5/14 |
| | | | 392/465 |
| 8,977,114 B2 | 3/2015 | Ellinger et al. | |
| 9,347,596 B2* | 5/2016 | Wortmann | F24S 40/00 |
| 2007/0235440 A1* | 10/2007 | Gu | H05B 1/0244 |
| | | | 219/482 |
| 2012/0328269 A1* | 12/2012 | Ellinger | B01J 19/02 |
| | | | 392/312 |
| 2014/0238523 A1* | 8/2014 | Wortmann | F24S 40/00 |
| | | | 138/33 |

FOREIGN PATENT DOCUMENTS

| | | |
|---|---|---|
| DE | 2362628 A1 | 6/1975 |
| DE | 3334334 A1 | 4/1985 |
| EP | 2537579 B1 | 4/2016 |
| GB | 2147776 A | 5/1985 |

* cited by examiner

DEVICE AND METHOD FOR HEATING A FLUID IN A PIPELINE USING THREE-PHASE CURRENT

The invention relates to a device for heating a fluid which is conducted in at least one pipeline and to a corresponding method for heating a fluid.

Such a device has at least one electrically conductive pipeline for accommodating the fluid, and at least one electrical energy source, for example a voltage source or current source, which is connected to the pipeline and is designed to generate a current in the at least one pipeline which heats the pipeline in order to heat the fluid by virtue of Joulean heat being generated in the pipeline owing to the electrical resistance of the at least one pipeline, which Joulean heat is proportional to the electric power converted there and the duration over which the current is flowing. Such a device is known from DE2362628C3, for example.

In the present case, a fluid is understood to mean a gaseous and/or liquid medium.

Instead of the abovementioned direct heating, in which the pipeline consists of an electrically conductive material and has current flowing through it itself, it is furthermore also known to attach heating elements, such as self-limiting heating strips, constant-power heating strips or mineral-insulated fixed resistance heating cables to the outer side of the pipeline to be heated in which the fluid to be heated is conducted, in order to heat the fluids. The respective pipeline with the heating strips is in this case generally insulated externally from heat losses with respect to the ambient air. By means of heat conduction or heat radiation, heat can now be emitted from the heating cable to the pipeline and from the pipeline to the medium located or flowing therein.

In the case of the abovementioned direct heating, it is particularly important to provide at least one insulation means, for reasons of redundancy often two insulation means, which prevent a parallel current path to the pipeline heated directly by current.

If the insulation means is impaired in terms of its effectiveness by the medium in the pipeline, direct heating needs to be disconnected for safety reasons. The parallel current flow in the totality of all of the installation parts takes place in uncontrolled fashion. Heat is generated at an unpredictable point, wherein, in the case of poor electrical connections of installation parts, sparks can also be produced, which represent a considerable safety risk, in particular in installations at risk of explosion.

Against this background, the present invention is based on the object of providing an improved device and improved method for heating a fluid which in particular makes it possible to reduce the number of insulation means which conventionally need to be provided without risking the disadvantages of a parallel current.

This object is achieved by a device having the features described herein. Advantageous configurations of the invention are also described.

A plurality of electrically conductive pipelines for accommodating the fluid are provided in accordance with the invention, as well as a plurality of voltage sources, wherein in each case one voltage source is assigned to each pipeline and is connected to the respective pipeline, wherein the respective voltage source is designed to generate an electric current in respect of the pipeline which heats the respective pipeline in order to heat the fluid, wherein the voltage sources have M outer conductors L1 to LM, where M is a natural number greater than or equal to two, and wherein the voltage sources are configured to provide an AC voltage at their outer conductors L1 to LM, wherein those AC voltages are phase-shifted through $2\pi/M$ with respect to one another, and wherein the outer conductors L1 to LM are electrically conductively connected to the respective pipeline 100 in such a way that a star circuit is formed, in which each outer conductor is electrically conductively connected to the neutral point of the star circuit over at least part of the respective pipelines.

It is also possible to form a plurality of star circuits with separate neutral points. Thus, for example, a separate star circuit can be formed for each pipeline.

In principle, the invention can also be applied to a single pipeline, which then has a voltage source assigned to it.

In accordance with a preferred embodiment of the invention, it is provided that the voltage sources each have a neutral conductor, wherein the respective voltage source is designed to provided in each case one AC voltage between the outer conductors and the neutral conductor, wherein those AC voltages are phase-shifted through $2\pi/M$ with respect to one another. Preferably the respective neutral conductor is electrically conductively connected to the neutral point.

A star circuit is understood here to mean an interconnection of any desired number of connections (M connection, where a possibly provided neutral conductor can also be connected to the neutral point) via in each case one resistor to a common point, which is referred to as the neutral point.

Advantageously, the neutral point does not conduct a current in the case of uniform loading of the M (for example M=3) outer conductors (in the case of nonuniform loading, only the difference between the currents or in the case of a high-resistance connection of the neutral conductor to the neutral point of the at least one pipeline, a differential voltage), with the result that an otherwise conventional insulation means at the inlet and at the outlet of the pipeline can be dispensed with.

Preferably, therefore, the at least one pipeline or the plurality of pipelines is configured in such a way that the currents cancel one another out at the neutral point. In other words, therefore, the electrically conductive connections produced (which each comprise part of the at least one pipeline) preferably have the same ohmic resistance between the respective outer conductor of the at least one voltage source and the neutral point, with the result that the individual currents cancel one another out at the neutral point.

As regards operational grounding, it is generally provided in the case of a provided neutral conductor (for example TN network) to ground the neutral point of the voltage source or the N connection. The grounding can in this case be implemented, for example, solidly at low-resistance or else inductively. In the case of a three-conductor network or IT network, in which there is no neutral conductor, this operational grounding is dispensed with.

In both abovementioned types of network, the neutral point of said star circuit according to the invention or of the at least one pipeline is preferably grounded, in particular solidly grounded. In the case of a power supply using the neutral conductor (for example TN network) in which the neutral point of the voltage source (N connection) is solidly grounded, the grounding of the neutral point of said star circuit or of the at least one pipeline can also be dispensed with in accordance with one variant embodiment of the invention.

The at least one pipeline or the plurality of pipelines may be a contiguous pipeline. However, the pipeline can also have a plurality of sections, which are not fluidically connected to one another and through which in each case one fluid to be heated can flow separately, if appropriate.

In accordance with a preferred embodiment, M=3, i.e. a three-phase alternating current is used, which is often also referred to as three-phase current. This is a polyphase alternating current which, in a known manner, consists of three individual alternating currents or AC voltages of the same frequency:

$$U_{L1} = U_0 \cos(\omega t),$$

$$U_{L2} U_0 \cos(\omega - 120°),$$

$$U_{L3} = U_0 \cos(\omega t - 240°),$$

which are shifted fixedly through 120°, i.e. $2\pi/3$ with respect to one another in terms of their phase angles.

The AC voltages reach their maximum deflection temporally successively with a shift of in each case a third of a period. The temporal shift in these so-called outer conductor voltages with respect to one another is described by a phase shift angle. The three conductors are referred to as outer conductors and are generally abbreviated to L1, 12 and L3. The neutral conductor is denoted by N.

In accordance with a further preferred embodiment of the device according to the invention, it is provided that the at least one pipeline or the pipelines each have M limbs (i.e., for example, in the case of M=3, a first, a second and a third limb), wherein each limb has a first and a second end section and a central section which fluidically and electrically conductively connects the two end sections to one another.

Preferably, the two end sections of the respective limb are connected to the neutral point, i.e. an electrical contact to the neutral point is provided at the respective end section or at two end sections of two adjacent limbs which are connected to one another.

Furthermore, provision is preferably made for the central sections of the limbs to each be electrically conductively connected to an assigned outer conductor L1 to LM (for example in the case of M=3, L1, L2 or L3) of the at least one voltage source, i.e. an electrical contact to the assigned outer conductor is provided at the respective central section, wherein, in particular in the case of the three-phase current (M=3), the central section of the first limb is connected to the L1 outer conductor, the central section of the second limb is connected to the L2 outer conductor, and the central section of the third limb is connected to the L3 outer conductor. Each outer conductor is assigned uniquely precisely to one central section of a limb.

The at least one pipeline is further preferably configured in such a way that, in the case of M limbs, the second end section of the first limb is fluidically and electrically conductively connected to the first end section of the second limb, and that (in the case of M>2) the second end section of the second limb is fluidically and electrically conductively connected to the first end section of the third limb. This is continued thus until the last (M-th) limb is reached. The M limbs of the at least one pipeline are in particular connected to one another in such a way that the fluid flowing therein can flow through said pipelines successively. Furthermore, preferably the first end section of the first limb forms an inlet for feeding the fluid into the at least one pipeline, wherein the second end section of the M-th limb preferably forms an outlet for allowing the fluid to pass out of the at least one pipeline. Said outlet can be fluidically connected to an inlet of a further pipeline. Furthermore, said inlet of the at least one pipeline can be fluidically connected to an outlet of a further pipeline (cf. below).

For the case of M=3, preferably the at least one pipeline is configured in this regard in such a way that the second end section of the first limb is fluidically and electrically conductively connected to the first end section of the second limb, and the second end section of the second limb is fluidically and electrically conductively connected to the first end section of the third limb, i.e. the three limbs of the at least one pipeline are in particular connected to one another in such a way that a fluid flowing therein can flow through said pipelines successively. Furthermore, preferably the first end section of the first limb forms an inlet for feeding the fluid into the at least one pipeline, wherein the second end section of the third limb preferably forms an outlet for allowing the fluid to pass out of the at least one pipeline. Said outlet can be fluidically connected to an inlet of a further pipeline. Furthermore, said inlet of the at least one pipeline can be fluidically connected to an outlet of a further pipeline (cf. below).

Preferably, end sections of two adjacent limbs which are fluidically and electrically connected to one another are electrically connected to the neutral point or neutral conductor via a common contact, wherein the contact can be provided, for example, at a transition between the two end sections connected to one another.

Said limbs can naturally also be formed separately from one another and correspondingly not be fluidically connected to one another. In this case, a plurality of fluid flows can be conducted independently of one another through the limbs and heated. The end sections of the limbs then form inlets or outlets via which the individual limbs can be delivered fluid separately.

Said limbs, if they are connected to one another, are preferably integrally formed over their end sections on adjacent limbs. Other fluidic and electrically conductive connections are also conceivable. Furthermore, in each case the central section provided between end sections of a limb is preferably formed integrally on the end sections provided on both sides. Other fluidic and electrically conductive connections are also conceivable in this regard. In principle, the limbs can assume all conceivable shapes and profiles.

Preferably, the limbs are configured substantially identically in respect of their dimensions and geometry or shape, with the result that they essentially represent the same resistive consumers. In the case of limbs with different configurations, compensating ohmic resistances or capacitive or inductive reactances can additionally be provided.

In accordance with a particularly preferred embodiment of the invention, the limbs are each in the form of a loop, wherein the central section of the respective limb forms an end of the respective loop, which is opposite the two end sections of the respective loop which are preferably arranged adjacent to one another, wherein, in particular in the region of the respective end, the respectively assigned outer conductor is electrically conductively connected to the respective limb. The end of the respective loop or limb is in this case preferably formed by a return bend of the respective central section, in which the fluid flowing in the respective limb or in the respective loop of the first end section changes its direction and flows back towards the second end section (or vice versa).

Preferably, the limbs or loops of the at least one pipeline each extend along a longitudinal axis, wherein the limbs or loops in particular have the same length along the longitudinal axis (see also above).

Furthermore, provision is preferably made for the end sections of the limbs of the at least one pipeline or pipelines with the respective electrical contact to the neutral point or neutral conductor to be arranged in a central region, from which the limbs extend outwards along a radial direction, to be precise in particular towards the respective end or return bend, at which preferably the respective electrical contact to the assigned outer conductor L1 to LM (or in the case of M=3, L1, L2 or L3) is provided.

In the case of a star-shaped arrangement of three limbs of a pipeline with respect to one another, the longitudinal axes of in each case two adjacent limbs can enclose an angle of 120°, for example.

In accordance with the invention, a plurality of the above described pipelines and in particular a plurality of voltage sources are provided, wherein in each case one voltage source is assigned to each pipeline. The outer conductors of a voltage source are then in turn connected to the assigned pipeline in such a way that, in turn, a star circuit is formed, in which each outer conductor is electrically conductively connected to the neutral point of the star circuit over at least part of the respective pipeline, wherein a possibly provided neutral conductor of the respective voltage source can be electrically conductively connected to the neutral point of the assigned pipeline (see above).

Preferably, in turn the voltage sources are in the form of three-phase AC voltage sources (i.e. M=3), with the result that the current generated in the respective pipeline for the direct Joulean heating of the respective pipeline is a three-phase alternating current.

The pipelines therefore in turn preferably each have M limbs or a first, a second and a third limb (in the case of M=3), wherein each limb of the respective pipeline has a first and a second end section as well as a central section, which connects the two end sections to one another. The two end sections of the respective limb of the respective pipeline section are preferably electrically conductively connected to the neutral point of the respective pipeline or the neutral conductor N of the assigned voltage source, as described above, whereas the central sections of the respective pipeline section are each preferably, as described above, connected to an assigned outer conductor (L1 to LM or, in the case of M=3, L1, L2 or L3) of the assigned voltage source.

The individual limbs of the plurality of pipelines are preferably, as illustrated above, connected to one another (or formed separately from one another), and furthermore preferably in the form of loops, wherein in turn the central section of the respective limb preferably forms an end or a return bend of the respective loop (see above), wherein the electrical contact to the respectively assigned outer conductor (L1 to LM or, in the case of M=3, L1, L2 or L3) is preferably provided in the region of the respective end or at the respective return bend (see also above).

Preferably, the end sections of the limbs of the respective pipeline with the respective, possibly joint electrical contact to the neutral point or neutral conductor N are arranged in a central region, from where the limbs of the pipelines extend outwards along a radial direction, wherein said ends or return bends are the furthest outwards, when viewed radially (for example on an imaginary circle around the central region).

In the case of a plurality of pipelines, a plurality of or else all of the pipelines can be fluidically connected in series with one another so that the fluid can flow through said pipelines successively.

Furthermore, there is also the possibility of connecting some or all of the pipelines in parallel with one another, i.e. configuring them in such a way that the fluid is divided into a plurality of partial flows, which then flow parallel through individual assigned pipelines.

Any desired configuration of pipelines connected in series or parallel is of course likewise possible.

Furthermore, the problem according to the invention is solved by a method for heating at least one fluid using at least one device according to the invention.

In this case, the fluid preferably flows through one or more pipelines of the device according to the invention and is heated therein by virtue of the at least one pipeline or the plurality of pipelines being heated by a polyphase alternating current or three-phase alternating current flowing in the at least one pipeline or in the plurality of pipelines, with the result that Joulean heat is generated in at least one pipeline or in the plurality of pipelines and is transferred to the fluid so that said fluid is heated as it flows through the at least one pipeline or the plurality of pipelines.

In accordance with one variant of the method according to the invention, it is provided that a hydrocarbon to be cracked thermally, in particular a mixture of hydrocarbons, is heated as fluid using at least one device according to the invention.

In accordance with a further variant of the method according to the invention, provision is alternatively or additionally made for water or steam to be heated as fluid using at least one device in accordance with the invention, wherein this steam is in particular heated to a reactor inlet temperature in the range of from 550° C. to 700° C. and in particular is added to the hydrocarbon(s) to be cracked.

In accordance with a further configuration of the method according to the invention, provision is alternatively or additionally made for a preheated hydrocarbon/steam mixture to be heated as fluid using at least one device according to the invention in order to crack the hydrocarbons. The device according to the invention is therefore used for the input of heat in the reactor part of a cracking furnace for cracking the preheated hydrocarbon/steam mixture. This is a very endothermic reaction in which the product gas leaves the reactor part at temperatures of typically from 800° C. to 880° C.

In particular, the mixture to be cracked, which is also referred to as reformer feed gas, and which has steam as well as one or various hydrocarbons (for example $CH_4$ to naphtha) and possibly hydrogen and other components, such as, for example, $N_2$, Ar, He, CO, $CO_2$, and/or MeOH, can be brought to a reformer entry temperature or overheated by means of the method according to the invention, said temperature preferably being in the temperature range of from 250° C. to 730° C., preferably 320° C. to 650° C., in particular at a pressure of the feed gas in the range of from 10 bar to 50 bar, preferably 15 to 40 bar.

Furthermore, by means of the method according to the invention, the combustion air of the reformer furnace can be preheated as fluid, to be precise in particular to a temperature in the range of from 200° C. to 800° C., preferably 400° C. to 700° C.

In particular, furthermore at least one reaction tube of the reformer furnace or the fluid flowing therein can be heated by means of the method according to the invention (the at least one pipeline of the device according to the invention can therefore be in the form of a reaction tube of a reformer). In this case, therefore, the input of heat by direct heating into the catalyst-filled reaction tube of the reformer furnace takes place by means of the method according to the invention. In this case, the product gas consisting of the main components of $H_2$, CO, $CO_2$, $CH_4$, $H_2O$ and inert substances can additionally be heated during the direct heating at the same time by burners in the radiation zone of the reformer furnace. The reaction is endothermic. The reformed gas leaves the radiation zone of the reformer furnace generally in the temperature range of from 780° C. to 1050° C., preferably 820° C. to 950° C. The pressure range of the gas is preferably in the range of from 10 bar to 50 bar, preferably 15 to 40 bar.

In particular, furthermore the dry feed gas to be cracked (i.e. in particular prior to mixing with steam), which has at least one or various hydrocarbons (for example $CH_4$ to naphtha) and possibly hydrogen and other components, such as, for example, $N_2$, Ar, He, CO, $CO_2$ and/or MeOH, can furthermore be heated as fluid by means of the method according to the invention for catalytic pre-purification, in particular to a temperature in the range of from 100° C. to 500° C., preferably 200° C. to 400° C., to be precise at a pressure of the gas in the range of from preferably 10 bar to 50 bar, preferably 15 to 45 bar.

Furthermore, in general the method according to the invention can be used to heat water as fluid in order to generate process steam, for example in all conceivable processes.

Further subjects of the invention (points 1 and 16) and configurations of the subject according to point 1 (points 2 to 15) are set forth below. The references between parentheses relate to the figures.

Point 1: Device for heating a fluid, comprising:
at least one electrically conductive pipeline (100) for accommodating the fluid (F), and
at least one voltage source (2), which is connected to the at least one pipeline (100), wherein the at least one voltage source (2) is designed to generate an electric current in the at least one pipeline (100) which heats the at least one pipeline (100) in order to heat the fluid (F), wherein the at least one voltage source (2) has at least M outer conductors (L1, . . . , LM), where M is a natural number greater than or equal to two, and wherein the at least one voltage source (2) is designed to provide an AC voltage at the outer conductors wherein those AC voltages are phase-shifted through $2\pi/M$ with respect to one another, and wherein the outer conductors (L1, . . . , LM) are electrically conductively connected to the at least one pipeline (100) in such a way that a star circuit is formed, in which each outer conductor (L1, . . . , LM) is electrically conductively connected to the neutral point (S) of the star circuit over at least part of the at least one pipeline (100).

Point 2: Device according to point 1, wherein the voltage source (2) has a neutral conductor (N), wherein in particular the neutral conductor (N) is electrically conductively connected to the neutral point (S).

Point 3: Device according to one of e preceding points, wherein M is equal to three.

Point 4: Device according to one of the preceding points, wherein the at least one pipeline (100) has M limbs (101), wherein each limb (101) has a first and a second end section (101a, 101c) and a central section (101b), which fluidically and electrically conductively connects the two end sections (101a, 101c) to one another.

Point 5: Device according to point 4, wherein the two end sections (101a, 101c, 102a, 102c, 103a, 103c) of the respective limb (101, 102, 103) are electrically conductively connected to the neutral point (S).

Point 6: Device according to one of points 4 to 5, wherein the central connections (101b, 102b, 103b) of the limbs (101, 102, 103) are each electrically conductively connected to the assigned outer conductor (L1, L2, L3) of the at least one voltage source (2).

Point 7: Device according to point 3 or one of points 4 to 6 insofar as said claims refer back to point 3, wherein the second end section (101c) of the first limb (101) is fluidically and electrically conductively connected to the first end section (102a) of the second limb (102), in particularly is integrally formed on said first end section, and wherein the second end section (102c) of the second limb (102) is fluidically and electrically conductively connected to the first end section (103a) of the third limb (103), in particular is integrally formed on said first end section, wherein in particular the first end section (101a) of the first limb (101) forms an inlet (3) for feeding the fluid (F) into the respective pipeline (100), and wherein in particular the second end section (103c) of the third limb (103) forms an outlet (4) for allowing the fluid (F) to pass out of the respective pipeline (100).

Point 8: Device according to one of points 4 to 6, wherein the limbs (101, 102, 103) are not fluidically connected to one another and are designed to each conduct a fluid (F, F', F") to be heated separately from one another.

Point 9: Device according to one of points 4 to 8, wherein the limbs (101, 102, 103) are each in the form of a loop, wherein the central section (101b, 102b, 103b) of the respective limb (101, 102, 103) forms an end of the respective loop (101, 102, 103), wherein in particular in the region of the respective end, the respectively assigned outer conductor (L1, L2, L3) is electrically conductively connected to the respective limb (101, 102, 103).

Point 10: Device according to one of points 4 to 9, wherein the limbs (101, 102, 103) each extend along a longitudinal axis (A), wherein in particular the limbs (101, 102, 103) have the same length, in particular along the respective longitudinal axis (A).

Point 11: Device according to one of points 4 to 10, wherein the end sections (101a, 101c; 102a, 102c; 103a, 103c) of the limbs (101, 102, 103) of the at least one pipeline (100) are arranged in a central region (B), from which the limbs (101, 102, 103) extend outwards along a radial direction (R).

Point 12: Device according to point 10 or 11, wherein the longitudinal axes (A) of in each case two adjacent limbs (101, 102; 102, 103; 103, 101) enclose an angle of 120°.

Point 13: Device according to one of the preceding points, wherein a plurality of pipelines (100) and in particular a plurality of voltage sources (2) are provided, wherein in particular in each case one voltage source (2) is assigned to each pipeline (100).

Point 14: Device according to point 13, wherein a plurality of or all of the pipelines (100) are fluidically connected in series with one another, with the result that the fluid (F) can flow through said pipelines successively.

Point 15: Device according to point 13 or 14, wherein a plurality of or all of the pipelines (100) are configured to be parallel, with the result that the fluid (F) can be divided among those parallel pipelines (100).

Point 16: Method for heating a fluid (F) using a device in accordance with one of points 1 to 15.

Further features and advantages of the present invention will be explained in the description of exemplary embodiments with reference to the figures, in which.

First, for reasons of simplicity, embodiments of the invention are illustrated below with reference to a pipeline 100. The measures illustrated using a pipeline can in this case naturally in each case be applied to a plurality of pipelines 100.

Figure 1:
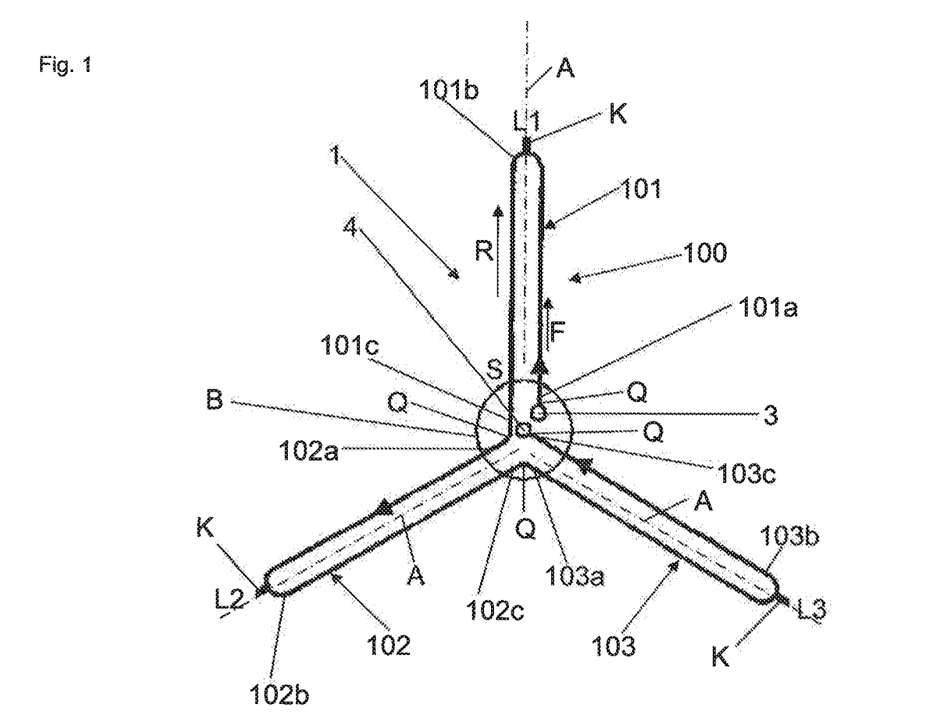
FIG. 1 shows a schematic illustration of a pipeline of a device according to the invention.

As shown in FIG. 1, in the case of direct heating with three-phase current of a pipeline 100 in a device 1 according to the invention for heating a fluid F, a neutral point S can be provided. In this case, the three phases L1, L2 and L3 of a three-phase system or of a three-phase voltage source 2 (cf. FIG. 5) are connected to the limbs 101, 102, 103 of the pipeline 100 and preferably the N conductor (neutral conductor), if provided, is connected to the neutral point S. In the case of solid or low-resistance grounding of the N connection or the neutral point S' of the voltage source 2 to ground (PE), as is conventional in power supply, and in the case of a connection of the neutral conductor N to the neutral point S of the pipeline 100, it is possible to dispense with grounding of the neutral point S at the pipeline 100.

Figure 5:
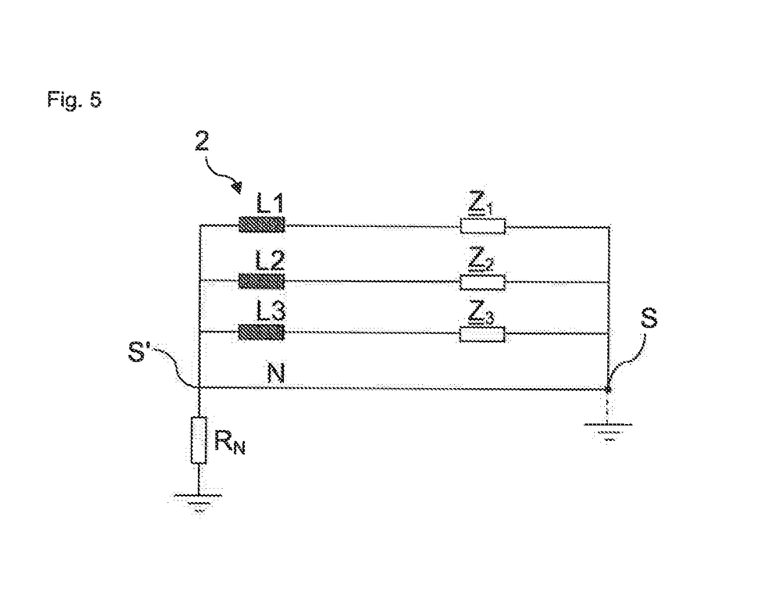
FIG. 5 shows a schematic illustration of the interconnection of the outer conductors and the neutral conductor in the case of a TN network.
Figure 6:
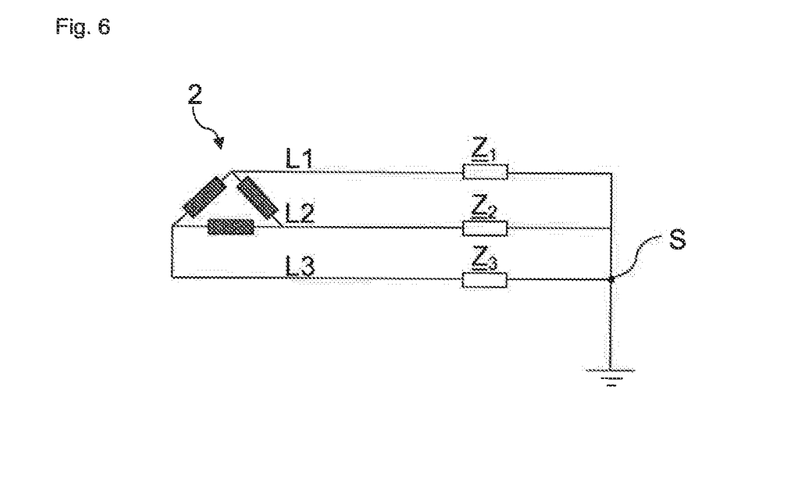
FIG. 6 shows a schematic illustration of the interconnection of the outer conductors in the case of an IT network.

As shown in FIGS. 5 and 6, the invention can be applied both as part of a network comprising (preferably three) outer conductors and a neutral conductor (for example TN network) and for a network without a neutral conductor (for example IT network).

FIG. 5 shows the three outer conductors L1, L2, L3 and the neutral conductor N of the voltage source 2, as are provided, for example, in a TN network. The neutral point S' of the voltage source 2, to which the neutral conductor N is electrically conductively connected, is in this case grounded via a resistor $R_N$, wherein in particular $R_N=0$ may hold true (solid grounding) or low-resistance, for example. $Z_1$, $Z_2$, $Z_3$ represent the loads or impedances which are formed by the at least one pipeline 100 or the limbs 101, 102, 103 thereof. The latter are interconnected at the neutral point S of the load or pipeline 100, wherein the neutral conductor N is electrically conductively connected to the neutral point S. In the case of solid operational grounding of the neutral point S' of the voltage source 2 ($R_N=0$), grounding of the neutral point S can be dispensed with, but is preferably provided.

FIG. 6 shows a three-conductor network (for example IT network), in which there is no neutral conductor N. In this case, the neutral point S, which is formed by the interconnection of the impedances $Z_1$, $Z_2$, $Z_3$, is preferably solidly grounded.

Without any restriction to generality, three outer conductors L1, L2, L3 and a neutral conductor N are assumed below. However, it is possible to dispense with the neutral conductor N (see above) or to vary the number of outer conductors (see above).

Specifically, a first limb 101 of the pipeline 100, starting from a first end section 101a or from the inlet 3, via which fluid F is fed into the pipeline 100, extends along a longitudinal axis A to a return bend of a central section 101b of the first limb 101, from where the central section 101b of the first limb 101 extends back to a second end section 101c, which is arranged adjacent to the first end section 101a in a central region B. The second end section 101c of the first limb 101 becomes a first end section 102a of the second limb 102, which, in a similar manner, extends over a return bend of its central region 102b to a second end section 102c of the second limb 102, which in turn becomes a first end section 103a of the third limb 103, which, in a similar manner, extends over a return bend of its central section 103b to a second end section 103c, at which an outlet 4 for allowing the (heated) fluids F to pass out of the pipeline 100 is provided. The three longitudinal axes A of the loop-shaped limbs 101, 102, 103 are preferably arranged in the form of a star, as shown in FIG. 1, i.e. in each case two adjacent limbs 101, 102; 102, 103; 103, 101 enclose an angle of 120°.

In this case, a contact K to an outer conductor L1, L2 or L3 of a three-phase current source 2 is provided at each return bend of a central section 101b, 102b, 103b of a loop 101, 102, 103, respectively, wherein the end sections 101a, 101c, 102a, 102c, 103a, 103c are connected to the neutral point S via contacts Q. In this case, preferably end sections 101c, 102a; 102c, 103a of the limbs 101, 102, 103 which are connected to one another are connected to the neutral point S or to the neutral conductor N via a contact Q at the transition between the respective end sections.

The arrangement shown in FIG. 1 can naturally also be used in the case of generally M phases, where M is a natural number greater than or equal to two. Then, correspondingly M limbs are provided and interconnected as described above.

Figure 2:
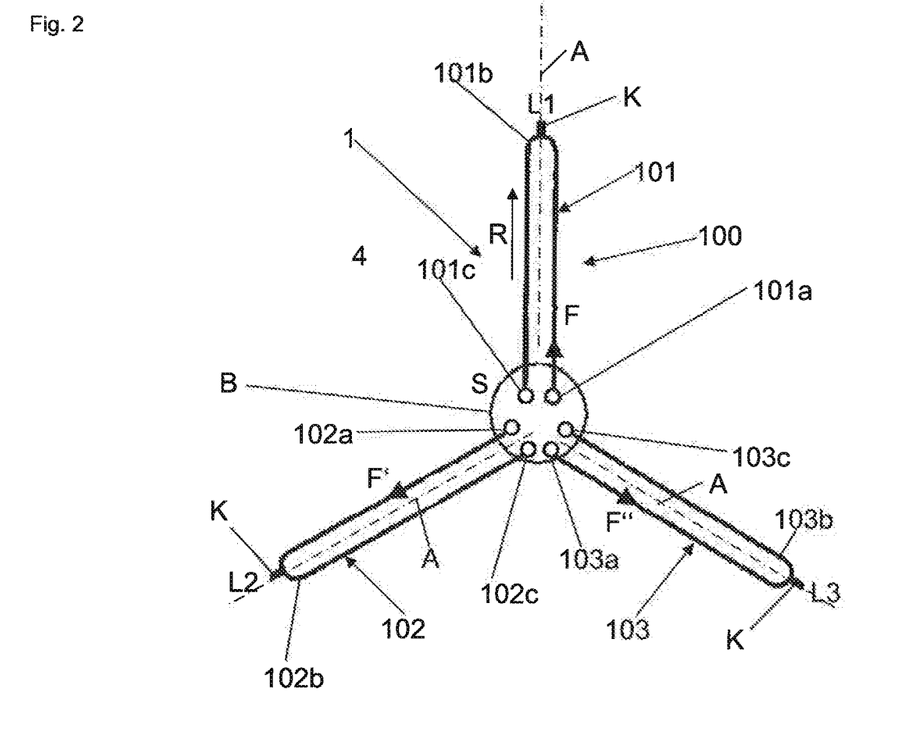
FIG. 2 shows a further development of the embodiment shown in FIG. 1.

Furthermore, as shown in FIG. 2, the limbs 101, 102, 103 can be formed separately from one another in the arrangement shown in FIG. 1, with the result that individual fluid flows F, F', F'' can flow through said limbs independently of one another. The first end sections 101a, 102a, 103a can in this case be in the form of inlets for the fluid flows F', F'' and the second end sections 101c, 102c, 103c can be in the form of outlets for the fluid flows, wherein those end sections 101a, 102a, 103a and 101c, 102c, 103c are in turn connected to the neutral point S.

Figure 3:
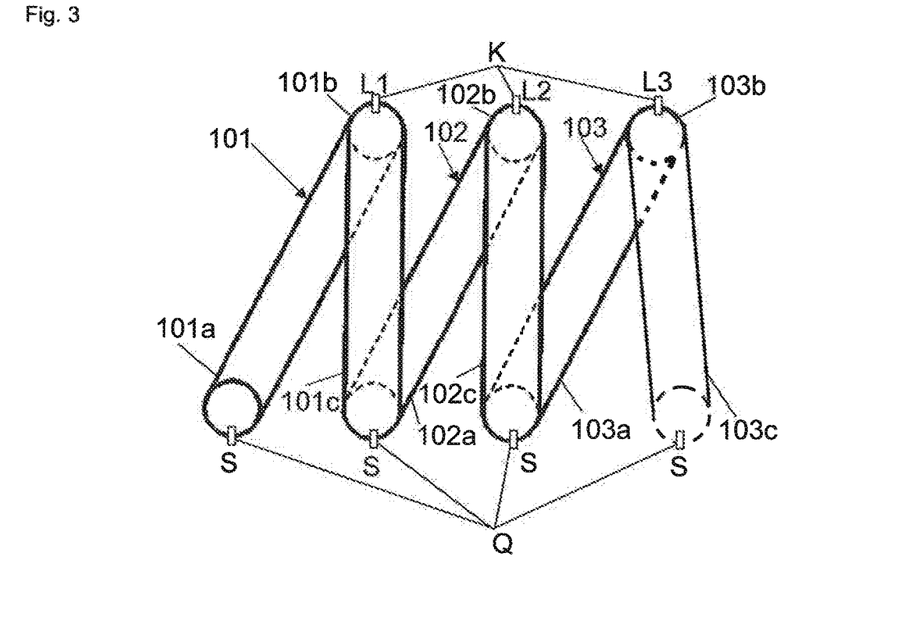
FIG. 3 shows a further schematic illustration of a pipeline of a device according to the invention.

FIG. 3 shows a variation of the profile of the limbs 101, 102, 103, wherein said limbs now run next to one another, in contrast to FIG. 1.

Figure 4:
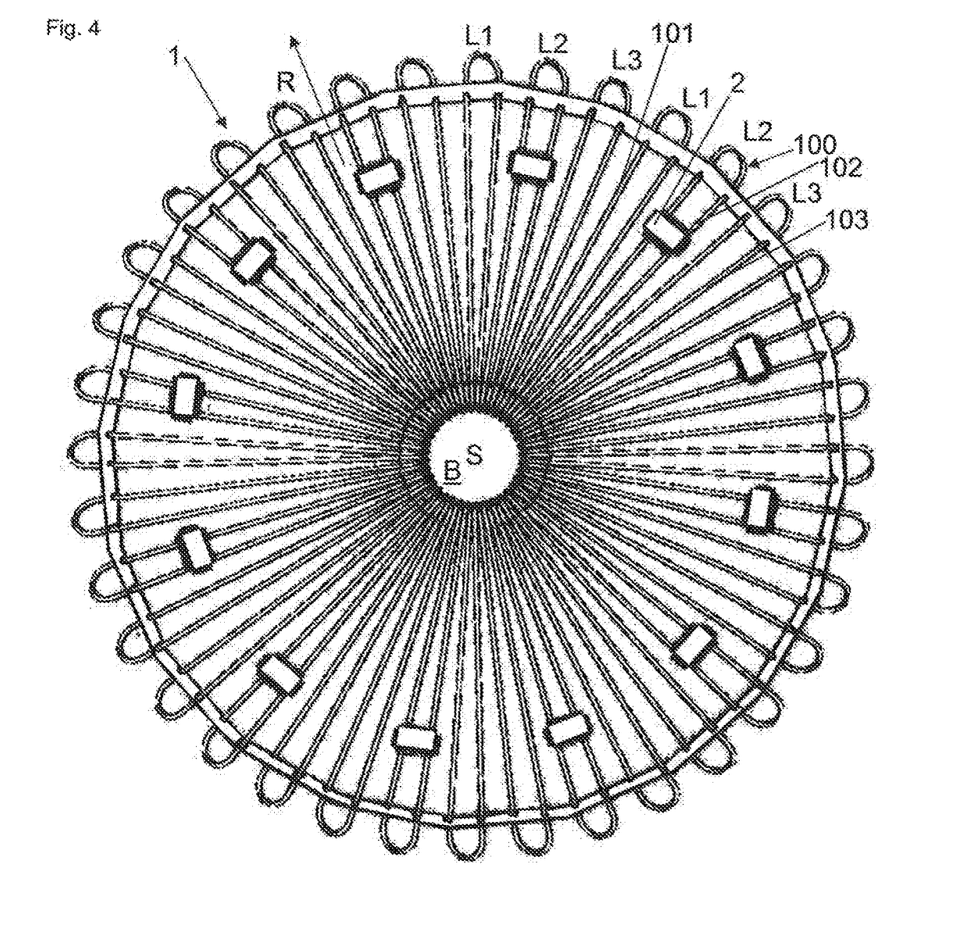
FIG. 4 shows an illustration of an arrangement of a plurality of pipelines of a device according to the invention.

This configuration in principle enables an arrangement of a plurality of pipelines 100 of the type shown in FIG. 3 next to one another, as is shown in FIG. 4, wherein in this case the individual limbs 101, 102, 103 each run outwards in the radial direction R starting from a central region B, in which the individual end sections are arranged, and are connected to the neutral point S there. The return bends of the individual loop-shaped limbs 101, 102, 103 are now further outwards in the radial direction R on an imaginary circle and are in each case connected to one phase L1, L2 or L3 of a three-phase current source 2.

Each pipeline 100 is in this case assigned to a three-phase current source 2, which is preferably arranged above the limbs and is arranged radially further inwards than the return bends. As a result, the feed lines to S (or N) and L1, L2, L3 can be minimized. The pipelines 100 have in each case three loop-shaped limbs 101, 102, 103, whose return bends are each connected to one of the outer conductor phases L1, L2 or L3 of the assigned voltage source 2.

For reasons of clarity, only one pipeline 100 is denoted in FIG. 4. The pipeline sections 100 shown in FIG. 4 can, as illustrated, be arranged in series such that the fluid F can flow through said sections successively. However, it is also possible for a divider to be provided in the central region B, which divides the fluid F among the individual pipelines 100, each comprising the three limbs 101, 102, 103, so that the fluid F flows through said limbs parallel to one another. Thereafter, the (heated) fluid F can be combined again and supplied for further use thereof.

In the examples described above, the three-phase current in the limbs 101, 102, 103 generates Joulean heat in each case owing to the electrical resistance of the limbs 101, 102, 103, which Joulean heat is transferred to the fluid F flowing in the limbs 101, 102, 103, wherein said limbs are heated.

Naturally, the arrangement shown in FIGS. 3 and 4 can likewise be generalized for M phases (M is greater than or equal to two).

The configuration of a three-phase direct heating shown in FIGS. 1 to 4 or the star-shaped arrangement of the individual limbs 101, 102, 103 shown therein is not absolutely necessary, however. In general, any geometric arrangement of pipelines 100 or limbs 101, 102, 103 is conceivable. The method according to the invention or the device 1 according to the invention can be applied in principle for all pressures, temperatures, dimensions, etc.

In the technical implementation, stainless steels are preferred over carbon steels for the pipelines 100 owing to the higher resistivity. Furthermore, the feed line of the polyphase or three-phase alternating current is preferably embodied with a markedly lower resistance than the pipeline conducting the fluid F in order to minimize the generation of heat of the feed line since this is generally undesirable.

The solution according to the invention can advantageously be applied, in particular when heating media which cause a reduction of dielectric strength (for example coking in the case of cracking furnaces). There is a comparatively low risk in this case of an undesired current flow, with the result that it is even possible to dispense with a switch-off device as mentioned at the outset.

Furthermore, there is the possibility of controlling the heating in the in each case three limbs 101, 102, 103 by virtue of the current flow of the respective phases L1, L2, L3 being set correspondingly (this also applies in the case of M phases, where M is greater than or equal to two).

In principle, the heating according to the invention of a fluid can be used for all media in electrically conductive pipelines. In the case of liquids which are very good conductors (in comparison with the electrical conductivity of the pipeline), this fact needs to be incorporated in the calculation of the current flow, if appropriate. The geometric profile of the pipelines or pipeline sections is advantageously flexible and can be matched to the respective requirements. Furthermore, the pipeline material can be matched to the process requirements. Currents, voltages and the frequency can be selected appropriately for the geometry and are not subject to any basic limitation. The maximum achievable temperature is limited by the pipeline material used.

LIST OF REFERENCE SYMBOLS

1 Device
2 Three-phase current source
3 Inlet
4 Outlet
100 Pipeline
101, 102, 103 Limb
101a, 102a, 103a First end section
101b, 102b, 103b Central section
101c, 102c, 103c Second end section
L1, L2, L3 Outer conductor
B Central region
N Neutral conductor
K, Q Electrical contacts
F, F', F" Fluid
A Longitudinal axis
R Radial direction
S Neutral point
S' Neutral point of voltage source

The invention claimed is:

1. A method for heating a fluid, the method comprising:
providing a device including
at least one electrically conductive pipeline for accommodating the fluid,
at least one voltage source having at least M outer conductors, where M is a natural number of greater than or equal to two, and
conductive connections between the outer conductors of the at least one voltage source and the at least one pipeline forming a star circuit, in which each outer conductor is electrically conductively connected to a neutral point of the star circuit over at least part of the at least one pipeline,
providing an alternating current (AC) voltage at each of the outer conductors of the voltage source such that the AC voltages are phase-shifted with respect to one another through $2\pi/M$,
generating an electric current in the at least one pipeline using the at least one voltage source and thereby heating the at least one pipeline,
passing the fluid through the at least one pipeline and heating said fluid in said at least one pipeline by virtue of said at least one pipeline being heated by the electric current generated using the at least one voltage source, and
providing said fluid as a mixture of hydrocarbons and steam, preheating said fluid before passing said fluid through the at least one pipeline of the device, and thermally cracking the hydrocarbons, or
providing the at least one pipeline in the form of at least one catalyst-filled reaction tube of a reformer.

2. The method according to claim 1, wherein each of the at least one voltage source has a neutral conductor,
the method further comprising electrically conductively connecting the neutral conductor to the neutral point of the star circuit.

3. The method according to claim 1, wherein M is equal to three.

4. The method according to claim 1, wherein said at least one pipeline has a plurality of limbs, wherein each limb has a first and a second end section and a central section,
the method further comprising fluidically and electrically conductively connecting the two end sections to one another.

5. The method according to claim 4, further comprising electrically conductively connecting the two end sections of each limb to the neutral point.

6. The method according to claim 4, further comprising electrically conductively connecting the central connections of each limb to the outer conductor of the at least one voltage source connected to the at least one pipeline.

7. The method according to claim 4, further comprising fluidically and electrically conductively connecting the second end section of a first limb to the first end section of a second limb or integrally forming the second end section of the first limb on said first end section of the second limb, and
fluidically and electrically conductively connecting the second end section of the second limb to the first end section of a third limb or integrally forming the second end section of the second limb on said first end section of the third limb, wherein the first end section of the first limb forms an inlet for feeding the fluid into the at least one pipeline, and wherein the second end section of the third limb forms an outlet for allowing the fluid to pass out of the at least one pipeline.

8. The method according to claim 1, wherein said at least one pipeline has a plurality of limbs, wherein each limb has a first and a second end section and a central section,
wherein the limbs are not fluidically connected to one another,
the method further comprising conducting a fluid within each limb to be heated separately from one another.

9. The method according to claim 4, wherein each of the limbs form a loop, wherein a central section of the limb forms an end of the loop, wherein in the region of the end, the respectively assigned outer conductor is electrically conductively connected to the limb.

10. The method according to claim 4, wherein the limbs each extend along a longitudinal axis, wherein each of the limbs have the same length along the longitudinal axis.

11. The method according to claim 4, wherein the end sections of the limbs of the at least one pipeline are arranged in a central region, from which the limbs extend outwards along a radial direction.

12. The method according to claim 10, wherein the longitudinal axes of each two adjacent limbs enclose an angle of 120°.

13. The method according to claim 1, further comprising fluidically connecting a plurality of the least one pipeline in series with one another, such that the fluid can flow through said plurality of the least one pipeline successively.

14. The method according to claim 1, wherein a plurality of the least one pipeline is configured to be parallel, such that the fluid can be divided among the parallel pipelines.

15. The method according to claim 1, further comprising:
generating the polyphase alternating current in the least one pipeline using the at least one voltage source connected to the at least one pipeline, wherein an AC voltage is provided at the outer conductors of the at least one voltage source.

16. The method according to claim 15, wherein the fluid that is heated is a hydrocarbon to be cracked thermally or a mixture of hydrocarbons.

17. The method according to claim 15, wherein the fluid that is heated is water or steam, wherein the water or steam is heated to a reactor inlet temperature of 550° C. to 700° C. to form heated steam, and further comprising adding the resultant heated steam to a hydrocarbon to be cracked.

18. The method according to claim 15, wherein the fluid that is heated is combustion air from a reformer furnace, and said combustion air is heated to a temperature of 200° C. to 800° C.

19. The method according to claim 18, wherein said combustion air is heated to a temperature of 400° C. to 700° C.

20. A thermal cracking or reformer furnace for heating a fluid, comprising
at least one electrically conductive pipeline for accommodating the fluid, and
at least one voltage source, wherein each voltage source is assigned to and connected to one of the at least one pipeline, wherein each voltage source is designed to generate an electric current in the pipeline to which it is connected to thereby heat the pipeline in order to heat the fluid accommodated in the pipeline,
wherein each voltage source has at least M outer conductors, where M is a natural number of greater than or equal to two, and wherein each voltage source is designed to provide an AC voltage at its outer conductors, wherein each of the AC voltages is phase-shifted with respect to one another through $2\pi/M$, and wherein the outer conductors of the each voltage source are electrically conductively connected to the respective pipeline in such a way that a star circuit is formed, in which each outer conductor is electrically conductively connected to a neutral point of the star circuit over at least part of the respective pipeline.

21. The thermal cracking or reformer furnace according to claim 20, wherein each voltage source of the at least one voltage source has a neutral conductor such that the neutral conductor of each voltage source is electrically conductively connected to the neutral point.

22. The device according to claim 20, wherein each pipeline of the at least one pipeline includes a plurality of limbs, such that each limb has a first and a second end section and a central section, which fluidically and electrically conductively connects the two end sections to one another.

* * * * *